Nov. 22, 1927.
H. PAYTON
ARM REST
Filed May 7, 1926
1,650,385
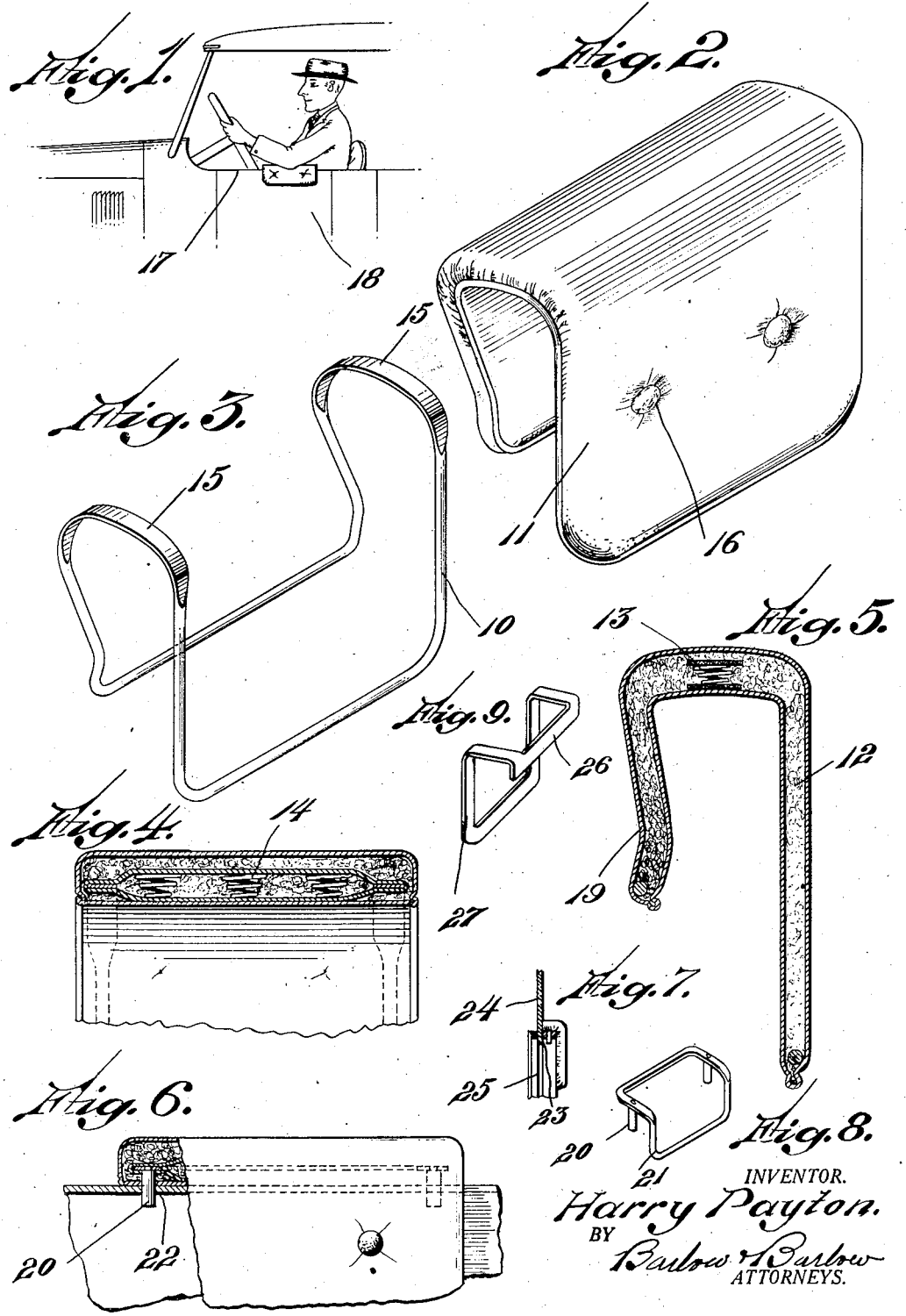
INVENTOR.
Harry Payton.
BY
Barbow & Barbow
ATTORNEYS.

Patented Nov. 22, 1927.

1,650,385

UNITED STATES PATENT OFFICE.

HARRY PAYTON, OF PROVIDENCE, RHODE ISLAND.

ARM REST.

Application filed May 7, 1926. Serial No. 107,368.

This invention relates to an arm rest of a type particularly adapted for use as a rest for an arm of a driver of a motor vehicle; and has for its object to provide a cushioning rest to absorb the shocks of the body of the vehicle and prevent these shocks from being transmitted to the person occupying the vehicle.

A further object of this invention is the provision of means by which such a rest may be simply constructed and detachably mounted on the desired portion of a vehicle for supporting an arm of an occupant thereof.

With these and other objects in view, the invention consists of certain novel features of construction, as will be more fully described, and particularly pointed out in the appended claim.

In the accompanying drawings:

Figure 1 is a side elevation illustrating the arm rest in position on a vehicle to support the arm of the driver thereof.

Figure 2 is a perspective view of the arm rest.

Figure 3 is a perspective view of the frame about which the arm rest is constructed.

Figure 4 is a fragmental sectional elevation illustrating the cushioning means of the arm supporting portion of the rest.

Figure 5 is a sectional elevation taken at right angles to that illustrated in Figure 4.

Figure 6 is an elevation partly in section illustrating a modified form of arm rest such as may be attached to a so-called closed model motor vehicle.

Figure 7 is a fragmental elevation partly in section illustrating the modified form shown in Figure 6 attached to a portion of the motor vehicle and abutting the glass window thereof.

Figure 8 is a perspective view of the frame such as used in the modified form illustrated in Figures 6 and 7.

Figure 9 is a perspective view of a still further modified form of frame having an edge to be inserted between the window and its casing to attach the rest in position.

It is found desirable in riding in a motor vehicle particularly in the driver's location, where the arm must be raised to engage the steering wheel, desirable to support the elbow of the arm upon the side wall or door of the vehicle, and it is found that such supporting of the arm often causes excessive wear to that portion of the clothing which engages the vehicle and causes the clothing to become excessively worn or become soiled. And further it is found that the shocks of the vehicle are transmitted to the arm making such supporting of the arm uncomfortable for the occupant of the vehicle, and in order to obviate this undesirable effect, I have provided an upholstered cushion rest which may be detachably secured to the desired portion of the vehicle body wall or door, which prevents shocks to the arm of the occupant and thus reduces the moving of the arm of the occupant relative to the support and prevents excessive wear of the clothing; and the following is a detailed description of the present embodiment of this invention illustrating a structure by which these desirable results may be accomplished:—

With reference to the drawings, 10 designates a metal frame formed as illustrated in Figure 3, over which a suitable covering 11 of flexible material is placed and which is provided with suitable padding 12, in which is mounted resilient means 13 in the form of springs 14 which extends between the bridge portions 15 of the frame and located in position to form a cushioning support for the arm.

Suitable buttoning means 16 may be provided for securing the padding in place.

The rest as illustrated in Figure 2 is in substantially U-shape and the inherent spring of the metal frame 10 is such that this new rest may be snapped over the edge 17 of the side wall or door 18 of a motor vehicle, as illustrated in Figure 1, and be frictionally there retained in a position to suitably support the arm of the occupant of the vehicle.

In some instances where a rest is desired to be secured to a closed motor vehicle, a modification of the securing means is desirable and thus pins 20 are provided on the frame 21 which is of a slightly different form and in substantially L-shape, as illustrated in Figure 8.

These pins extend into suitable recesses 22 in the casing 23 of the closed body of the motor vehicle, the same having a suitable window 24 and a groove 25 for lowering the same.

In still other instances where pins and holes for securing the rest in place is not desired a lip 26 is provided on a modied frame 27, which lip is left exposed in the upholstery of the frame so that this lip may fit between the window and its casing, in instances where a narrow opening is provided to secure the rest in place.

From the foregoing it will be seen that I have disclosed a rest which is extremely simple in construction, one which effectively cushions the arm of the occupant of a motor vehicle, protects the clothing of the occupant from wear and soil and provides more comfort in driving.

The foregoing description is directed solely towards the construction illustrated, but I desire it to be understood that I reserve the privilege of resorting to all the mechanical changes to which the device susceptible, the invention being defined and limited only by the terms of the appended claim.

I claim—

An arm rest for a vehicle or the like comprising a continuous frame having an inverted U-shaped member at each end, the tops of the members being of substantial length, resilient cushioning means extending between the top portions of said members, and upholstery means extending over the cushioning means and frame, the arms of the members having inherent resiliency and being adapted to grip the side wall of the vehicle to hold the rest in position.

In testimony whereof I affix my signature.

HARRY PAYTON.